Feb. 26, 1957 L. FLEMING 2,783,379
BEAT FREQUENCY OSCILLATOR
Filed Jan. 24, 1955
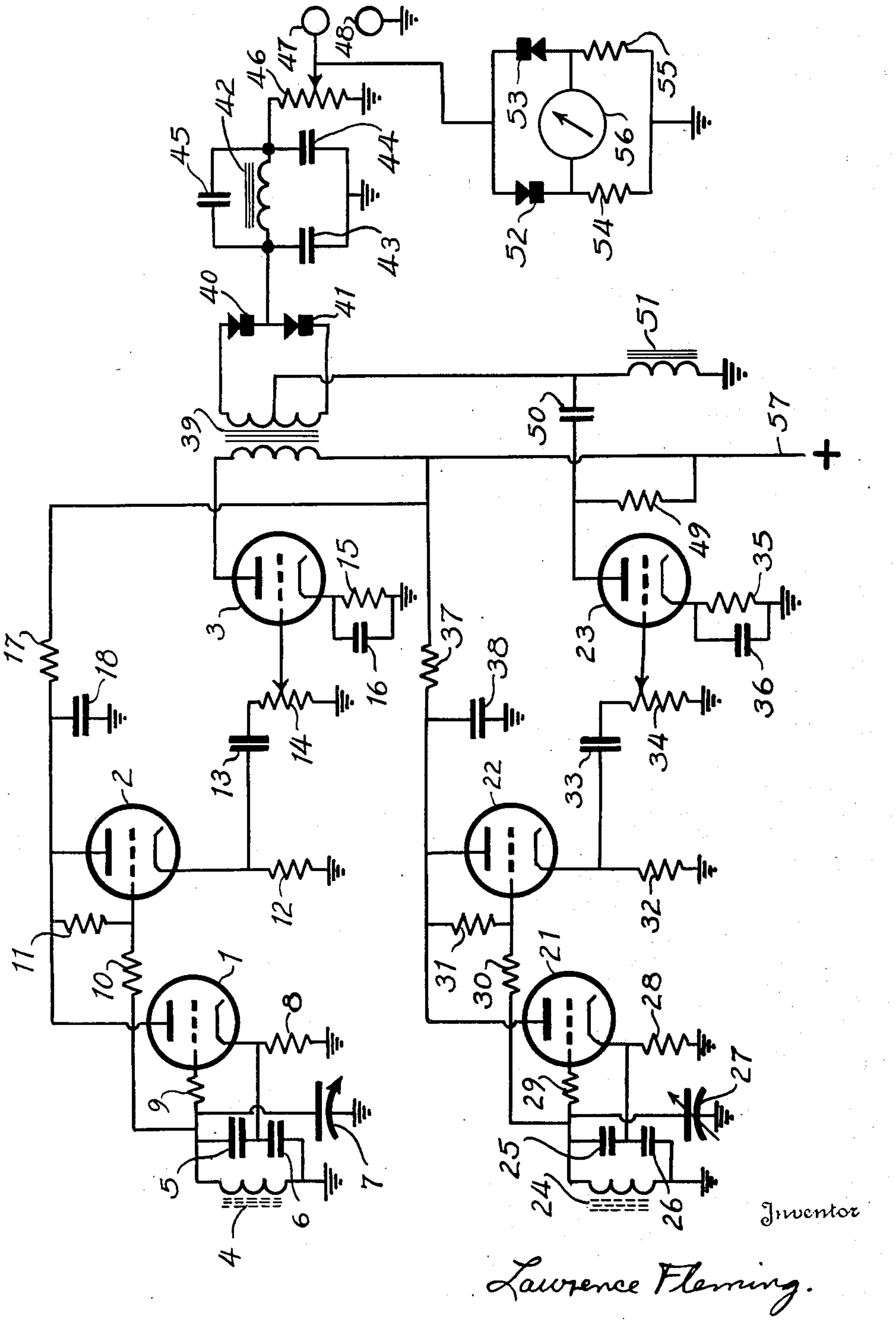
Inventor
Lawrence Fleming.
By
Attorney United States Patent Office 2,783,379

Patented Feb. 26, 1957

2,783,379

BEAT FREQUENCY OSCILLATOR

Lawrence Fleming, Falls Church, Va.

Application January 24, 1955, Serial No. 483,599

4 Claims. (Cl. 250—36)

This invention relates to instruments for generating electrical signals of widely variable frequency in which the outputs of two oscillators, one of them of variable frequency, are mixed in a detector circuit to produce a difference or beat frequency, this beat frequency being the frequency of the desired output signal. The invention relates particularly to such instruments having a range of output frequencies in the low-frequency region, e. g. 0 to 50 cycles per second.

A feature of the invention resides in the detector and output circuitry, wherein frequency response flat down to zero cycles or D. C. and an output free from any steady D. C. component are realized without the use of D. C. amplifiers or bucking circuits.

An object of the invention is to provide a beat-frequency oscillator of substantially less cost and complexity than prior instruments.

Another object is to provide a beat-frequency oscillator having no inherent limitation as to the lowest obtainable output frequency.

Other objects will appear hereinafter.

In the drawing, the single figure is a schematic circuit diagram of a preferred embodiment of the invention.

The circuit shown in the drawing comprises two similar L-C oscillators employing electron tubes 1 and 21, two similar buffer amplifiers connected as cathode followers employing tubes 2 and 22 respectively, and two power amplifiers employing tubes 3, 23. The outputs of these power amplifiers are mixed in a phase detector circuit utilizing rectifiers 40, 41. The output of the phase detector is passed through a low-pass filter to remove the carrier oscillator frequencies, leaving only the beat or difference frequency, and thence to the output terminals.

Referring to the drawing in more detail, the oscillator comprising tube 1 has a tuned circuit made up of an inductor 4, fixed capacitors 5, 6, and a variable capacitor 7. Any of the known oscillator circuit configurations may be used, but the one shown is a modified form of the Colpitts circuit. A preferred frequency of operation is 1000 cycles when the range of beat output frequencies is to be 0 to 50 cycles. Variable capacitor 7 constitutes a relatively small portion of the total capacitance across inductor 4, permitting a total variation in oscillator frequency of 50 cycles, i. e. from 1000 to 950 cycles per second. The junction point of capacitors 5 and 6 constitutes a tap on the tuned circuit to which is connected the cathode of tube 1. A D. C. return path to ground is provided by a resistor 8.

The other oscillator is similar, comprising tube 21, a tuned circuit employing inductor 24, fixed capacitors 25, 26, variable capacitor 27, and a cathode resistor 28. Since the frequency of this oscillator does not vary with rotation of the main tuning dial, which operates capacitor 7, the capacitor 27 is a semi-adjustable device, as by means of a screwdriver. Capacitor 27 may be paralleled by a smaller variable capacitor for the purpose of fine adjustment. The frequency of operation of this oscillator comprising tube 21 is the same as the frequency of the oscillator comprising tube 1 at such time as main tuning capacitor 7 is set at minimum capacitance.

High resistances 9 and 29 are connected in the grid circuits of each oscillator to reduce the effects of grid current on oscillator frequency and thereby aid stability.

Signal voltage across the tuned circuit of each oscillator is fed to the grid of a triode connected as a cathode follower by means of resistors 10, 11 and 30, 31. These resistors serve the dual purpose of passing signal to the cathode follower grids, tubes 2 and 22, and of providing positive grid return voltage for the cathode follower grids.

Tubes 2 and 22 may be operated as conventional triode amplifiers or may be pentodes operated as conventional amplifiers, since their primary purpose is to act as buffer or isolating devices to prevent locking or synchronization of the two oscillators when their difference frequency is small.

Following cathode followers 2 and 22 are two single-stage amplifiers 3 and 23, their inputs being coupled through capacitors 13, 33, and being provided with adjustable potentiometers 14, 34 for the purpose of adjusting their respective input signal levels. Tubes 3 and 23 are shown as triode tubes but may be amplifiers of any type. Tube 3 is biased by means of a cathode resistor 15, shunted by a bypass capacitor 16. Tube 23 is similarly biased with a resistor 35 and capacitor 36.

The output of amplifier 3 is connected to the primary of a transformer 39, of a type to pass signals of the order of the oscillator frequency, e. g. 1000 cycles. The secondary of transformer 39 is center-tapped. The ends of the secondary are connected to a pair of rectifiers 40, 41. The junction between rectifiers 40, 41 is connected to the input of a low-pass filter 42, 43, 44, 45, designed to pass frequencies in the desired beat output range, e. g. 0 to 50 cycles, and reject the carrier oscillator frequencies, e. g. 1000 cycles. The filter may suitably consist of a series inductor 42, shunt capacitors 43, 44, and an additional capacitor 45 of a value such as to form a parallel-resonant circuit at the carrier frequency in conjunction with inductor 42, in order to enhance the rejection of the carrier frequency.

The low-pass filter is followed by a variable attenuator 46, which may be of any type, and whose output is connected to the output terminals of the instrument, 47, 48.

The output of carrier amplifier 23 is fed into the rectifier circuit 40, 41 via the center-tap of transformer 39. Signal from the plate side of plate load resistor 49 for tube 23, is coupled by means of capacitor 50 to the said center-tap. A D. C. return path to ground for the rectifier circuit is provided through a choke 51, of a type designed to have a high impedance at the carrier oscillator frequency.

The rectifier circuit comprising transformer 39 and rectifiers 40, 41 is one of a family of circuits known as phase detectors. The polarity of the output of such detectors depends on the relative phase of the two signals fed into the circuit. If the phase is changing rapidly and continuously, that is, if the two carrier signals have a substantial and constant difference in frequency, the polarity of the output of the detector will oscillate continuously about zero as a reference line. Hence the output of such detectors contains the carrier frequencies and the modulation products, including the desired difference frequency, but no D. C. component. Accordingly, after the low-pass filter 42—45 has removed the carrier frequencies, harmonics, and sum frequencies from the output of the phase detector, there remains at the output terminals the difference frequency voltage, oscillating symmetrically about ground potential, as is desirable. Detector circuits of the types conventionally used in beat-frequency oscillators commonly deliver to their load circuits a D. C. signal component many times larger than the magnitude of the desired beat frequency signal, which is undesirable if the output be utilized without amplification, and which is usually removed by coupling capacitors or transformers, or by bucking out the D. C. component by any of the usual methods practiced in the D. C. amplifier art. In the case of coupling capacitors or transformers the low-frequency response of the output circuitry is objectionably limited, and in the case of bucking circuits, the whole instrument and its adjustment becomes undesirably complicated and tends to drift. Neither of these objections is present in this invention.

Phase detector circuit 39, 40, 41, is preferably operated at a relatively high signal level, for example, 50 volts across the secondary of transformer 39 and 5 volts across choke 51, so that several volts of useful low-frequency output is obtainable across the output terminals 47, 48. Rectifiers 40, 41 may be of any suitable type but dry-disc rectifiers are preferred.

An output metering circuit comprising rectifiers 52, 53, resistors 54, 55, and a D. C. indicating instrument 56, is connected to the output terminals without any intervening capacitor. This circuit is a half-bridge rectifier; a conventional full bridge may be used alternatively. The output meter serves both as an average-reading A. C. voltmeter for indicating the A. C. output voltage, and as a D. C. instrument for adjusting the oscillator 21 to give true zero beat when the main tuning dial is set at zero frequency.

Any conventional power supply may be used for plate power for the tubes, connected between ground and the positive plate supply bus 57. Plate supply decoupling for the oscillator and buffer stages is provided by series resistors 17, 37, and filter capacitors 18, 38. Resistors 17 and 37 may be connected to a separate regulated voltage supply of 150 volts instead of to the main supply. The main supply voltage may be from 150 to 300 volts. A suitable set of values for the components is:

| | |
|---|---|
| Inductors **4, 24, 42, 51** | 1 henry |
| Capacitors **5, 25** | .006 mfd. |
| Capacitors **6, 26** | 0.5 mfd. |
| Capacitors **7, 27** | 365 mmf. |
| Resistors **8, 28** | 4700 ohms |
| Resistors **9, 29** | 1 megohm |
| Resistors **10, 30** | 1 megohm |
| Resistors **11, 31** | 3.3 megohms |
| Resistors **12, 32** | 22,000 ohms |
| Capacitors **13, 33** | .001 mfd. |
| Potentiometers **14, 34** | 250,000 ohms |
| Resistor **15** | 1000 ohms |
| Capacitors **16, 36** | 10 mfd. |
| Resistors **17, 37** | 10,000 ohms |
| Capacitors **18, 38** | 10 mfd. |
| Resistor **35** | 2200 ohms |
| Resistor **49** | 10,000 ohms |
| Capacitor **50** | .05 mfd. |
| Capacitors **43, 44** | 0.25 mfd. |
| Capacitor **45** | .003 mfd. |
| Potentiometer **46** | 3000 ohms |
| Resistors **54, 55** | 47,000 ohms |
| Meter **56** | 0-200 microamperes D. C. |
| Rectifiers **40, 41** | Selenium, 100-volt rating |
| Rectifiers **52, 53** | Germanium crystal type |
| Tubes **1, 2, 21, 22** | Type 12AT7 |
| Tubes **3, 23** | Type 12BH7 |

With unselected rectifiers at 40, 41 the D. C. component of the signal at the output terminals 47, 48 is ordinarily less than five percent of the A. C. component. While this is as good symmetry as is usually required, it can be improved by selection of the rectifiers or by auxiliary balancing circuits of known types.

The main purpose of potentiometers 14, 34 is to adjust the signal levels into the detector circuit for minimum distortion in the signal at the output terminals, which can in practice be reduced below 1 percent.

Various embodiments and modifications within the spirit and scope of the invention will be apparent to those skilled in the art.

I claim:

1. A beat-frequency oscillator comprising a fixed carrier frequency oscillator, a variable carrier frequency oscillator, a phase detector containing only passive circuit elements, signal paths from each of said oscillators to said phase detector, and a direct-current and alternating-current signal path containing a low-pass filter from said phase detector to a pair of output terminals, whereby a variable-frequency beat-frequency signal is obtained at said output terminals which has substantially no limitation on the lowest beat frequency available but which contains substantially no direct-current component.

2. A beat-frequency oscillator for generating signals of variable and relatively low frequency comprising a first carrier oscillator, buffer amplifier, and power amplifier, a second carrier oscillator, buffer amplifier, and power amplifier, the outputs of each of said power amplifiers feeding a phase detector, and a direct-current and alternating-current signal path containing a low-pass filter from said phase detector to a pair of output terminals, whereby a variable-frequency beat-frequency signal is obtained at said output terminals which has substantially no limitation on the lowest beat frequency available but which contains substantially no direct-current component.

3. A beat-frequency oscillator comprising a fixed carrier frequency oscillator, a variable carrier frequency oscillator, carrier amplifier means, and a detector connected to mix the two carrier frequencies from said oscillators, said detector comprising a plurality of rectifiers in a balanced circuit producing an output containing alternating-current modulation products but substantially no rectified direct-current component, and direct-coupled circuitry comprising a low-pass filter but no amplifying devices connected between said detector and a pair of output terminals.

4. A beat-frequency oscillator as set forth in claim 3 further characterized in that a full-wave rectifier and D. C. indicating meter are direct-connected to said output terminals.

References Cited in the file of this patent

UNITED STATES PATENTS 2,360,764 Crosby ............... Oct. 17, 1944

OTHER REFERENCES

"General Radio Experiments," for July 1942, vol. 17 No. 2, pp. 1–3 and Fig. 4.